(12) United States Patent
Follet

(10) Patent No.: X8339
(45) Date of Patent: Aug. 14, 1834

(54) PRESS, TUB, FOR OLEAGINOUS SEEDS, &C.

(76) Inventor: Francis Follet

Francis Follet of Petersburg, county of Dinwiddie State of Virginia

Letters Patent

---

The Schedule referred to in these Letters Patent and making part of the same, containing a description in the words of the said Francis Follet himself of his improvement in the apparatus for pressing oleaginous seeds &c. which he calls a press tub –

---

To all whom it may concern – Be it known, that I Francis Follet of the town of Petersburg in the county of Dinwiddie and state of Virginia, have made certain improvements in the vessel or cylinder, and its appurtenances which I denominate a Press-Tub, in which seeds or Kernels of various Kinds are to be placed for the purpose of being pressed, to extract the oil from them, and which may also be used for the pressure of other substances from which fluids are to be obtained, and I do hereby declare that the following is a full and exact description of my said invention. The instrument or vessel as improved by me, consists of a bed plate on which the Cylinder to be presently described, is to be placed, of a metallic Cylinder to contain the seeds &c. of a strainer of a particular construction, which forms the bottom of the Cylinder and of a piston which is to be forced into the Cylinder by the Press. The instrument may be varied in size, according to the power of the press employed: But as in general, I esteem one of the capacity of about a bushel a good size for ordinary purposes, the proportions which I shall give for the purpose of description will be such as I deem suitable for one of that size, and I shall suppose most parts thereof to be made of cast iron intending of course to vary the same when other materials are employed according to the strength or tenacity of such materials – The cylinder of cast iron may be about 13 inches in height and 16 inches in diameter in the clear and one inch & a half in thickness – It is to be bored or turned in the inside so as to be perfectly true. To receive the strainer, a rebate is formed at its lower end, adapted to the diameter and thickness thereof. Around the upper edge of the cylinder a groove is to be formed, to serve as a gutter to receive and conduct the oil &c. which may rise up in pressing and a channel is formed on the outside thereof, to conduct it down from this groove. The strainer is formed by making an iron hoop, say 17 inches in diameter, half an inch thick, and three fourths of an inch ~~thick~~ deep more or less. This is to be turned true and to fit exactly into the rebate in the Cylinder. To form this into a strainer, I take hoop iron of the same width as the afore~~na~~med hoop, and of such thickness as I may prefer say 1/16 of an inch and this I coil round in the manner of the spring of a time piece, leaving a small space say 1/16 of an inch between each coil and continuing it until it fills the hoop entirely. This I confine in its place by passing rods of round iron through it and through the hoop; or in any other suitable manner, altho' I account this the easiest and best way of forming the strainer, it may also be made by forming the hoop iron into a sufficient number of concentric hoops or by cutting it into straight bars and confining them within the hoop or ring first described. When this strainer is in its place, it is to be precisely flush with the bottom of the cylinder The piston may be cast in the form of a hollow cylinder with one end closed. The closed end is to be perfectly flat and its sides turned so as to fit and slide accurately within the cylinder. The length may be such as to adapt it to the press in which it is to be used, and in all cases it will be best to allow it to project not less than two or three inches above the top of the cylinder, when the pressing is completed. A block of wood may be adapted to its interior and furnished with flush rings or staples by which to lift it. The bed plate is to be made perfectly flat and of such diameter as to admit of a channel being formed around it, projecting beyond the outside of the Cylinder with a lip or spout to conduct off the oil. The flat surface of the bed plate upon which the strainer rests, is formed into parallel grooves leading into the circular channel - They may be 1/4 of an inch on the face, and at the same distance apart, a 1/4 or 3/8 of an inch deep at the centre, increasing in depth as they approach the channel, that the oil may flow freely along them - Should this apparatus be used in a hori-zontal press, the circular grooves or channels will not be required - The bed plate should be from one and a half to two inches in thickness When using this press tub or box, I place a circular piece of stout woolen cloth or felt upon the strainer, and a similar piece between the seed to be pressed and the piston - What I claim as my invention is, the forming of the strainer in the way described, & the manner of adapting it to the Cylinder, for the purpose of pressing seeds and other articles Witnesses
Wm. F. I. Davis
J. G. Oxall Jos. Follet Exd.
W.G.C.

958 [illegible]